Patented May 16, 1939

2,158,957

UNITED STATES PATENT OFFICE 2,158,957

HYDROXY-ALKYL ETHERS OF SUBSTITUTED PHENOLS

Gerald H. Coleman and John W. Zemba, Midland, Mich., assignors to The Dow Chemical Company, Midland, Mich., a corporation of Michigan No Drawing. Application February 20, 1937,
Serial No. 126,810

5 Claims. (Cl. 260—613)

This invention concerns hydroxy-alkyl ethers of substituted phenol compounds containing a tertiary-alkyl group attached to the benzene nucleus and in which the alkyl residue of the hydroxy-alkyl radical contains at least 2 carbon atoms.

We have prepared members of this class of compounds, determined certain physical characteristics thereof whereby they may be readily identified, and found that they are particularly useful in the preparation of compositions for the control of household insect pests, such as fly sprays.

These new compounds may be prepared by reacting a suitable phenol compound with a monohalo-aliphatic alcohol, e. g. ethylene bromohydrin, 1-chloro-propanol-3, etc., in the presence of a suitable alkali, e. g. sodium hydroxide, potassium hydroxide, etc.

In preparing our new compounds, the phenol may be dissolved in aqueous alkali, and the halo-alcohol added thereto at a reaction temperature with stirring. If desired, however, the reaction may be carried out by first mixing the phenol with the halo-alcohol and subsequently adding thereto the alkali. While any suitable quantities of reactants may be employed, good yields of the desired products can be obtained when equimolecular proportions of reactants are used. The reaction may be conveniently carried out at the refluxing temperature of the mixture, but lower or higher temperatures may be employed. In certain cases where the reactants are not readily soluble in aqueous alkali, alcohol or other miscible organic solvent may be added to the reaction mixture. Following completion of the reaction, the mixture is allowed to stand and separate into layers, the oily layer being subsequently separated, and the desired compound isolated therefrom by fractional distillation under reduced pressure or otherwise.

Our new compounds may also be prepared by reacting a tertiary-alkyl-substituted phenol compound with an alkylene oxide in the presence of a suitable catalyst, e. g. sulfuric acid. The alkylene oxide, e. g. butylene oxide, can be passed into a mixture of the phenol compound, catalyst, and an inert organic solvent, e. g. carbon tetrachloride, at temperatures below the boiling point of the reaction mixture. The mixture is stirred until the reaction is substantially complete, and is thereafter washed successively with aqueous alkali and water, and fractionally distilled to obtain the desired hydroxy-alkyl ether product.

The following examples describe in detail the preparation of certain individual members of our new class of compounds, but are not to be construed as limiting the invention:

Example 1

150 grams (1 mol) of 4-tertiary-butyl phenol and 192 grams (1 mol) of a 42 per cent aqueous azeotrope of ethylene chlorohydrin were mixed together and 133 grams of a 30 per cent aqueous sodium hydroxide solution added thereto over a period of one hour at temperatures gradually increasing from 25° to 42° C. Stirring was maintained for an additional hour after which the reaction batch was allowed to stand for 16 hours at room temperature. An oily layer separated therefrom and was fractionally distilled, whereby 145 grams (0.748 mol) of the beta-hydroxy-ethyl ether of 4-tertiary-butyl phenol was obtained as a water white oil boiling at 126.5°–127.5° C. at 4 millimeters pressure, freezing at approximately 15° C. and having a specific gravity of 1.015 at 20°/4° C. This compound was substantially insoluble in water but somewhat soluble in most organic solvents.

Example 2

1 mol of 4-tertiary-amyl phenol, 1 mol of sodium hydroxide, and 2.5 mols of water were mixed together and 192 grams of a 42 per cent aqueous azeotrope of ethylene chlorohydrin reacted therewith substantially as described above. The resulting oily layer was fractionated, whereby there was obtained 0.35 mol of the beta-hydroxy-ethyl ether of 4-tertiary-amyl phenol. This compound is a water white liquid boiling at 145°–148° C. at 4 millimeters pressure, and having a specific gravity of 1.0045 at 20°/4° C.

Example 3

In a similar manner 1 mol each of 4-tertiary-octyl phenol, ethylene chlorohydrin, and sodium hydroxide were reacted together in the presence of 200 milliliters of 50 per cent ethanol and 111 milliliters of water, whereby there was obtained 0.768 mol of the desired ether product. Beta-hydroxy-ethyl ether of 4-tertiary-octyl phenol is a water white liquid boiling at 170°–173° C. at 6–7 millimeters pressure and having a specific gravity of 0.9860 at 20°/4° C.

Example 4

2 mols of 4-tertiary-butyl phenol, 2 mols of sodium hydroxide, and 400 milliliters of water were mixed together, and 2 mols of propylene chlorhydrin in the form of a 51 per cent aqueous azeotrope gradually added thereto over a period of 2 hours and at temperatures gradually increasing from 79° C. to 96.5° C. The reaction mixture was refluxed for a short time after the addition of the chlorohydrin, cooled, acidified, and the resulting oil separated therefrom. The latter was washed with water and distilled whereby there was obtained 1.4 mols of the hydroxy-propyl ether of 4-tertiary-butyl phenol as a white crystalline solid, melting at 45° C., and boiling at 150°–155° C. at 10 millimeters pressure.

Other compounds prepared in a similar manner include the following:

Beta-hydroxy-ethyl ether of 2-chloro-4-tertiary-butyl phenol, a water white liquid boiling at 130°–132° C. at 2 millimeters pressure, and having a specific gravity of 1.121 at 20°/4°C.;

Beta-hydroxy-ethyl ether of 2-methyl-4-tertiary-butyl phenol, a white crystalline solid boiling at 130°–132° C. at 3 millimeters pressure and having a melting point of 36° C.;

Beta-hydroxy-ethyl ether of 2,4-di-tertiary-butyl-6-chlorophenol, a thick viscous liquid boiling at 151°–154° C. at 2 millimeters pressure, and having a specific gravity of 1.072 at 20°/4° C.

Among other hydroxy-alkyl ethers of tertiary-alkyl substituted phenol compounds which may be prepared according to the above-described procedures are the corresponding mono-ethers of 1,3-di-hydroxy-propane, 1,4-dihydroxy-butane, 1,3-dihydroxy-2-methyl-propane, 1,2-dihydroxy-2-methyl-propane, 1,2-dihydroxy-n-butane, the di-hydroxy-pentanes, etc. These compounds may be prepared by substituting chloro-alcohols such as 1-chloro-propanol-3, 1-bromo-butanol-4, 1-bromo-2-methyl-propanol-3, 1-chloro-butanol-2, the halopentanols, etc., for those chloro-hydrins shown in the examples. Similarly, other substituted phenol compounds may be reacted substantially as described to produce a large number of compounds falling within the scope of our invention. Among the compounds which may be so prepared are: beta-hydroxy-ethyl ether of 2-tertiary-butyl phenol; beta-hydroxy-ethyl ether of 3-tertiary-butyl phenol; beta-hydroxy-ethyl ether of 2-tertiary-amyl phenol; beta-hydroxy-ethyl ether of 3-tertiary-amyl phenol; beta-hydroxy-ethyl ether of 2-tertiary-hexyl phenol; beta-hydroxy-ethyl ether of 3-tertiary-hexyl phenol; beta-hydroxy-ethyl ether of 4-tertiary-hexyl-phenol; beta-hydroxy-ethyl ether of 4-tertiary-heptyl phenol; beta-hydroxy-ethyl ether of 2-tertiary-octyl-phenol; beta-hydroxy-ethyl ether of 2-tertiary-butyl-6-chloro-phenol; beta-hydroxy-ethyl ether of 2-tertiary-butyl-4-chloro-phenol; beta-hydroxy-ethyl ether of 2-tertiary-butyl-4-bromo-phenol; beta-hydroxy-ethyl ether of 2-tertiary-butyl-5-chloro-phenol; beta-hydroxy-ethyl ether of 2-tertiary-butyl-4,6-dichloro-phenol; beta-hydroxy-ethyl ether of 2-tertiary-butyl-4,6-dibromo-phenol; beta-hydroxy-ethyl ether of 3-tertiary-butyl-4-chloro-phenol; beta-hydroxy-ethyl ether of 2-tertiary-amyl-4-chloro-phenol; beta-hydroxy-ethyl ether of 2-tertiary-amyl-6-chloro-phenol; beta-hydroxy-ethyl ether of 2-tertiary-amyl-4-bromo-phenol; beta-hydroxy-ethyl ether of 3-tertiary-amyl-6-bromo-phenol; beta-hydroxy-ethyl ether of 2-bromo-4-tertiary-butyl phenol; beta-hydroxy-ethyl ether of 3-chloro-4-tertiary-butyl-phenol; beta-hydroxy-ethyl ether of 2-chloro-4-tertiary-amyl phenol; beta-hydroxy-ethyl ether of 2-bromo-4-tertiary-amyl phenol; beta-hydroxy-ethyl ether of 2,6-dichloro-4-tertiary-butyl phenol; beta-hydroxy-ethyl ether of 2,6-dibromo-4-tertiary-butyl phenol; beta-hydroxy-ethyl ether of 2-chloro-4-tertiary-hexyl phenol; beta-hydroxy-ethyl ether of 2-bromo-4-tertiary-hexyl phenol; beta-hydroxy-ethyl ether of 2,6-dichloro-4-tertiary-hexyl phenol; beta-hydroxy-ethyl ether of 2-bromo-4-tertiary-heptyl phenol; beta-hydroxy-ethyl ether of 2-chloro-4-tertiary-octyl phenol; beta-hydroxy-ethyl ether of 2-bromo-4-tertiary-octyl phenol; beta-hydroxy-ethyl ether of 2,6-dibromo-4-tertiary-octyl phenol; beta-hydroxy-ethyl ether of 2-chloro-4-tertiary-butyl-6-bromo phenol; beta-hydroxy-ethyl ether of 2-tertiary-butyl-4-methyl phenol; beta-hydroxy-ethyl ether of 2-tertiary-butyl-5-methyl phenol; beta-hydroxy-ethyl ether of 2-tertiary-butyl-6-methyl phenol; beta-hydroxy-ethyl ether of 2-tertiary-butyl-4-ethyl phenol; beta-hydroxy-ethyl ether of 2-tertiary-butyl-4-n-propyl phenol; beta-hydroxy-ethyl ether of 2,4-ditertiary-butyl phenol; beta-hydroxy-ethyl ether of 2-tertiary-amyl-4-methyl phenol; beta-hydroxy-ethyl ether of 2-tertiary-amyl-3-methyl phenol; beta-hydroxy-ethyl ether of 2,4-ditertiary-amyl phenol; beta-hydroxy-ethyl ether of 2-methyl-4-tertiary-octyl phenol; beta-hydroxy-ethyl ether of 2-tertiary-butyl-4-tertiary-octyl phenol; beta-hydroxy-ethyl ether of 2-secondary-butyl-4-tertiary-butyl phenol; beta-hyroxy-ethyl ether of 2,5-ditertiary-butyl phenol; beta-hydroxy-ethyl ether of 2-methyl-5-tertiary-amyl phenol; beta-hydroxy-ethyl ether of 2,6-dimethyl-4-tertiary-butyl phenol; beta-hydroxy-ethyl ether of 2,4-dimethyl-6-tertiary-butyl phenol; beta-hydroxy-ethyl ether of 2,4-diethyl-6-tertiary-amyl phenol; beta-hydroxy-ethyl ether of 2,5-di-isopropyl-4-tertiary-octyl phenol; beta-hydroxy-ethyl ether of 2,5-ditertiary-butyl-4-chloro-phenol; beta-hydroxy-ethyl ether of 2-methyl-5-tertiary-amyl-4-bromo phenol; beta-hydroxy-ethyl ether of 2,4-ditertiary-amyl-6-bromo-phenol; beta-hydroxy-ethyl ether of 2-isopropyl-4-tertiary-amyl-6-chloro-phenol; beta-hydroxy-ethyl ether of 2-methoxy-4-tertiary-butyl phenol; beta-hydroxy-ethyl ether of 2-n-propyloxy-4-tertiary-amyl phenol; beta-hydroxy-ethyl ether of 2-tertiary-butyl-4-methoxy phenol; beta-hydroxy-ethyl ether of 3-methoxy-4-tertiary-octyl phenol; beta-hydroxy-ethyl ether of 2-methoxy-4-tertiary-butyl-6-methyl phenol; beta-hydroxy-ethyl ether of 2-methoxy-4-tertiary-amyl-6-chloro-phenol; beta-hydroxy-ethyl ether of 2-methoxy-4-bromo-6-tertiary-butyl phenol; beta-hydroxy-ethyl ether of 2-tertiary-butyl-4-phenylethyl phenol; beta-hydroxy-ethyl ether of 2-tertiary-amyl-4-benzyl phenol; beta-hydroxy-ethyl ether of 2-benzyl-4-tertiary-hexyl phenol; beta-hydroxy-ethyl ether of 2-methoxy-4-tertiary-butyl-6-benzyl phenol; beta-hydroxy-ethyl ether of 2-benzyl-4-tertiary-octyl-6-chloro-phenol; beta-hydroxy-ethyl ether of 2-tertiary-butyl-4-bromo-6-benzyl phenol; beta-hydroxy-ethyl ether of 2-methyl-4-tertiary-butyl-6-benzyl phenol; beta-hydroxy-ethyl ether of 3-tertiary-heptyl-6-benzyl phenol; beta-hydroxy-ethyl ether of 2,5-ditertiary-butyl-4-benzyl phenol; beta-hydroxy-ethyl ether of 2-acetyl-4-tertiary-butyl phenol; beta-hydroxy-ethyl ether of 2-tertiary-amyl-4-acetyl phenol; beta-hydroxy-ethyl ether of 3-propionyl-4-tertiary-octyl phenol; beta-hydroxy-ethyl ether of 2-chloro-4-tertiary-butyl-6-acetyl phenol; beta-hydroxy-ethyl ether of 2-methyl-4-propionyl-5-tertiary-amyl phenol; beta-hydroxy-ethyl ether of 3-tertiary-butyl-4-bromo-6-butyryl phenol; beta-hydroxy-ethyl ether of 2-methoxy-4-tertiary-butyl-6-acetyl phenol; beta-hydroxy-ethyl ether of 2-tertiary-amyl-4-benzyl-6-propionyl phenol; hydroxy-propyl ether of 2-tertiary-butyl phenol; hydroxy-propyl ether of 3-tertiary-butyl phenol; hydroxy-propyl ether of 2-tertiary-amyl phenol; hydroxy-propyl ether of 3-tertiary-amyl phenol; hydroxy-propyl ether of 4-tertiary-amyl phenol; hydroxy-propyl ether of 4-tertiary-hexyl phenol; hydroxy-propyl ether of 4-tertiary-octyl phenol; hydroxy-propyl ether of 2-tertiary-butyl-4-chloro-phenol; hydroxy-propyl ether of 2-tertiary-butyl-6-chloro-phenol; hydroxy-propyl ether of 2,6-dibromo-4-tertiary-butyl phenol; hydroxy-propyl ether of 2,6-dichloro-4-tertiary-amyl phenol; hydroxy-propyl ether of 2-chloro-4-tertiary-octyl phenol; hydroxy-propyl ether of 2-methyl-4-tertiary-butyl phenol; hydroxy-propyl ether of 2-methyl-5-tertiary-amyl phenol; hydroxy-propyl ether of 2,6-di-ethyl-4-tertiary-amyl phenol; hydroxy-propyl ether of 3-methoxy-4-tertiary-butyl phenol; hydroxy-propyl ether of 2-methoxy-4-tertiary-amyl-6-bromo-phenol; hydroxy-propyl ether of 2-tertiary-butyl-4-benzyl phenol; hydroxy-propyl ether of 3-propionyl-4-tertiary-octyl phenol; hydroxy-butyl ether of 4-tertiary-butyl phenol; hydroxy-butyl ether of 2-tertiary-butyl phenol; hydroxy-butyl ether of 4-tertiary-amyl phenol; hydroxy-butyl ether of 4-tertiary-octyl phenol; hydroxy-butyl ether of 2-chloro-4-tertiary-butyl phenol; hydroxy-butyl ether of 2-methyl-5-tertiary-butyl phenol; hydroxy-butyl ether of 2-tertiary-amyl-4-n-propyloxy phenol; hydroxy-pentyl ether of 4-tertiary-butyl phenol; hydroxy-pentyl ether of 4-tertiary-amyl phenol; hydroxy-pentyl ether of 4-tertiary-octyl phenol; hydroxy-pentyl ether of 2-chloro-4-tertiary-butyl phenol; hydroxy-pentyl ether of 2-bromo-4-tertiary-amyl phenol; hydroxy-pentyl ether of 2,4-ditertiary-butyl phenol; etc.

Certain of the above described group of compounds have been tested by the Peet-Grady method (Soap, 8, No. 4, 1932) and found to be particularly valuable as fly spray toxics. For example, a 3 per cent solution of the beta-hydroxy-ethyl ether of 4-tertiary-butyl phenol in kerosene was found to give in excess of a 90 per cent knockdown and an average kill of over 45 per cent in 24 hours. A 5 per cent solution of beta-hydroxy-ethyl ether of 4-tertiary-octyl phenol killed 19.7 per cent of house flies contacted therewith when tested in a similar manner.

Other modes of applying the principle of our invention may be employed instead of those explained, change being made as regards the materials employed provided the products described in the following claims be thereby obtained.

We, therefore, particularly point out and distinctly claim as our invention:

1. An hydroxy-alkyl ether of a tertiary-alkyl phenol compound in which the tertiary-alkyl group contains from 4 to 6 carbon atoms, inclusive, the benzene ring contains at least one additional substituent which is non-reactive with acids and alkalies in the etherification reaction, and the alkyl residue of the hydroxy-alkyl radical contains at least 2 carbon atoms.

2. A beta-hydroxy-ethyl ether of a tertiary-alkyl phenol compound in which the tertiary-alkyl group contains from 4 to 6 carbon atoms, inclusive, and the benzene ring contains at least one additional substituent non-reactive with acids and alkali in the etherification reaction.

3. An hydroxy-propyl ether of a tertiary-alkyl phenol compound in which the tertiary-alkyl group contains from 4 to 6 carbon atoms, inclusive, and the benzene ring contains at least one additional substituent non-reactive with acids and alkali in the etherification reaction.

4. An hydroxy-alkyl-ether of a tertiary-butyl phenol compound in which the benzene ring contains at least one additional substituent non-reactive with acids and alkalies in the etherification reaction, and the alkyl residue of the hydroxy-alkyl group contains at least 2 carbon atoms.

5. A beta-hydroxy-ethyl ether of a tertiary-butyl phenol compound in which the benzene ring contains at least one additional substituent non-reactive with acids and alkalies in the etherification reaction.

GERALD H. COLEMAN.
JOHN W. ZEMBA.